US008783886B2

(12) United States Patent
Huang

(10) Patent No.: US 8,783,886 B2
(45) Date of Patent: Jul. 22, 2014

(54) ILLUMINATION SYSTEM

(75) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 487 days.

(21) Appl. No.: 13/169,443

(22) Filed: Jun. 27, 2011

(65) Prior Publication Data

US 2012/0182712 A1   Jul. 19, 2012

(30) Foreign Application Priority Data

Jan. 19, 2011  (TW) .............................. 100101899 A

(51) Int. Cl.
*F21V 9/00* (2006.01)
*G02B 5/26* (2006.01)
*F21V 5/02* (2006.01)

(52) U.S. Cl.
CPC .... *G02B 5/26* (2013.01); *F21V 5/02* (2013.01)
USPC .............................. 362/34; 362/231; 362/293

(58) Field of Classification Search
CPC ........... G02B 5/26; F12V 5/02; F12V 7/0083; F12V 7/07; F12V 9/00; F21S 48/1317
USPC .................... 353/81, 30, 37, 99; 362/553, 259
See application file for complete search history.

(56) References Cited

U.S. PATENT DOCUMENTS

| | | | |
|---|---|---|---|
| 6,299,312 B1 * | 10/2001 | Choi et al. ...................... 353/31 |
| 6,733,139 B2 | 5/2004 | Childers et al. |
| 7,493,030 B2 | 2/2009 | Kakkori |
| 7,830,929 B2 | 11/2010 | Egawa |

(Continued)

FOREIGN PATENT DOCUMENTS

| | | |
|---|---|---|
| CN | 1898968 | 1/2007 |
| CN | 101233440 | 7/2008 |

(Continued)

OTHER PUBLICATIONS

Office Action from related Chinese Appln. No. 201110043239.3 dated Nov. 18, 2013. Summary translation attached.
Office Action from related Taiwanese Appln. No. 100101899 dated Aug. 5, 2013. Summary translation attached.
Office Action from related Taiwanese Appln. No. 100101899 dated Nov. 7, 2013. Summary translation attached.

*Primary Examiner* — Sharon Payne
(74) *Attorney, Agent, or Firm* — Grossman, Tucker, Perreault & Pfleger, PLLC

(57) ABSTRACT

An illumination system for use in a projection device is provided. The illumination system comprises a first light source, a second light source, an optical device, a wavelength transformer and a first dichroic mirror. The first light source and the second light source emit a first light beam and a second light beam respectively. The optical device defines a main optical axis and focuses the first light beam and the second light beam on a first focal point and a second focal point respectively, wherein the first focal point and the second focal point are disposed on two opposite sides of the main optical axis respectively. The wavelength transformer is disposed on the second focal point and transforms the second light beam into a third light beam. The first dichroic mirror is disposed between the light sources and the optical device. The first light beam and the second light beam are allowed to pass through the first dichroic mirror, and the third light beam is reflected by the first dichroic mirror. After being reflected by the first dichroic mirror, the third light beam is focused onto the first focal point.

19 Claims, 6 Drawing Sheets

(56) References Cited

U.S. PATENT DOCUMENTS

| | | |
|---|---|---|
| 2005/0270775 A1 | 12/2005 | Harbers et al. |
| 2006/0274277 A1 | 12/2006 | Magarill et al. |
| 2007/0146639 A1 | 6/2007 | Conner |
| 2008/0170207 A1 | 7/2008 | Egawa |
| 2009/0033885 A1* | 2/2009 | Shirai et al. ............ 353/85 |
| 2009/0128781 A1 | 5/2009 | Li |
| 2009/0262308 A1 | 10/2009 | Ogawa |
| 2010/0328627 A1 | 12/2010 | Miyazaki |
| 2012/0062857 A1* | 3/2012 | Saitou et al. ............ 353/98 |

FOREIGN PATENT DOCUMENTS

| | | |
|---|---|---|
| CN | 101504506 | 8/2009 |
| CN | 101937127 | 1/2011 |
| JP | 2003-248196 | 9/2003 |
| JP | 2008-134320 | 6/2008 |
| TW | 200410009 | 6/2004 |
| TW | 200620255 | 6/2006 |

* cited by examiner

US 8,783,886 B2

ILLUMINATION SYSTEM

This application claims the benefit from the priority of Taiwan Patent Application No. 100101899 filed on Jan. 19, 2011, and the disclosure of which is incorporated by reference herein in its entirety.

CROSS-REFERENCES TO RELATED APPLICATIONS

Not applicable.

BACKGROUND OF THE INVENTION

1. Field of the Invention

The present invention provides an illumination system, and more particularly, to an illumination system which is for use in a projection device, has less optical components and can improve the light combining efficiency.

2. Descriptions of the Related Art

Because solid light sources such as lasers and light emitting diodes (LEDs) have advantages, such as saving energy, a high light-emitting efficiency, a concentrated luminance and a long service life, the use of the solid light sources as light sources of projection devices has received much attention in the art. In U.S. Patent Publication No. US 2009/0262308, a light source unit and a projector 10 are disclosed. As shown in FIG. 1, the light source unit 63 has a red LED 161R, a green LED 161G and a blue LED 161B, and light beams are combined through a plurality of condensing lenses 164 disposed adjacent to the LEDs 161R, 161B and 161G respectively. It shall be noted that the light source unit 63 has to condense the light beams through the condensing lenses 164 disposed adjacent to the LEDs 161R, 161B and 161G to combine the light beams; therefore, in this U.S. Patent Publication, the light source unit 63 has to be provided with a large number of optical components, which increases the weight of the light source unit 63. Moreover, sufficient space is needed in the projector 10 to accommodate the light source unit 63. Consequently, this type of light source unit is limited by the volume and is unsuitable for use in a miniaturized projector.

In view of this, an urgent need exists in the art to provide a solution that can effectively arrange a plurality of light sources and optical components in a projector so that the light-emitting efficiency is improved while the volume and the weight of the light emitting source can still be effectively reduced.

SUMMARY OF THE INVENTION

An objective of the present invention is to provide an illumination system in which, by skillfully arranging the individual light sources and optical components, the number of optical components to be used and the volume of the illumination system are reduced and the light combining efficiency of the illumination system is increased.

To achieve the aforesaid objective, an illumination system according to an embodiment of the present invention comprises a first light source, a second light source, a third light source, an optical device, a wavelength transformer and a first dichroic mirror. The first light source and the second light source emit a first light beam and a second light beam respectively. The optical device defines a main optical axis and focuses the first light beam and the second light beam onto a first focal point and a second focal point respectively. In addition, the first focal point and the second focal point are disposed on two opposite sides of the main optical axis respectively. The first dichroic mirror is disposed between the light sources and the optical device, and is adapted to allow the first light beam, the second light beam and the fourth light beam to travel therethrough and to reflect the third light beam. The first and the fourth light beams are focused into the first focal point. The second light beam is focused into the second focal point. The wavelength transformer is disposed at the second focal point and transforms the second light beam into a third light beam. The third light beam emitted from the second focal point then sequentially passes through the optical device, and is then reflected by the first dichroic mirror to the optical device to be focused on the first focal point.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
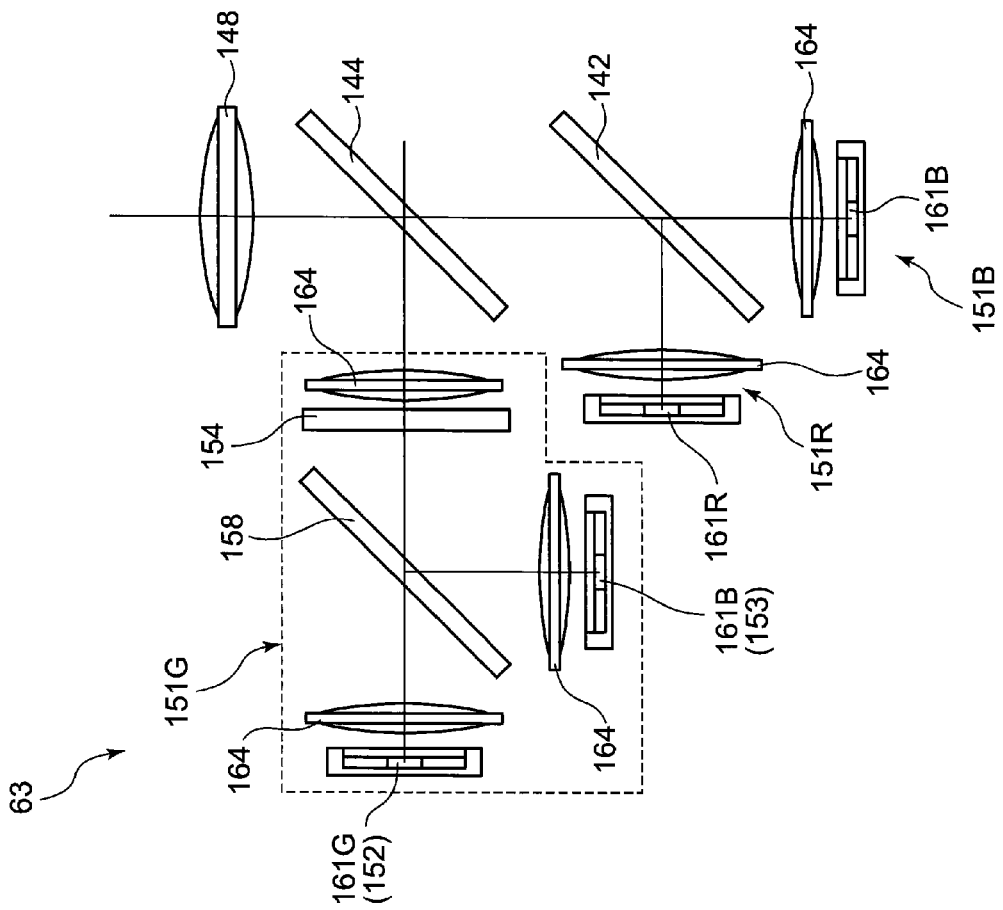
FIG. 1 is a schematic diagram illustrating the prior art of the present invention.
Figure 2:
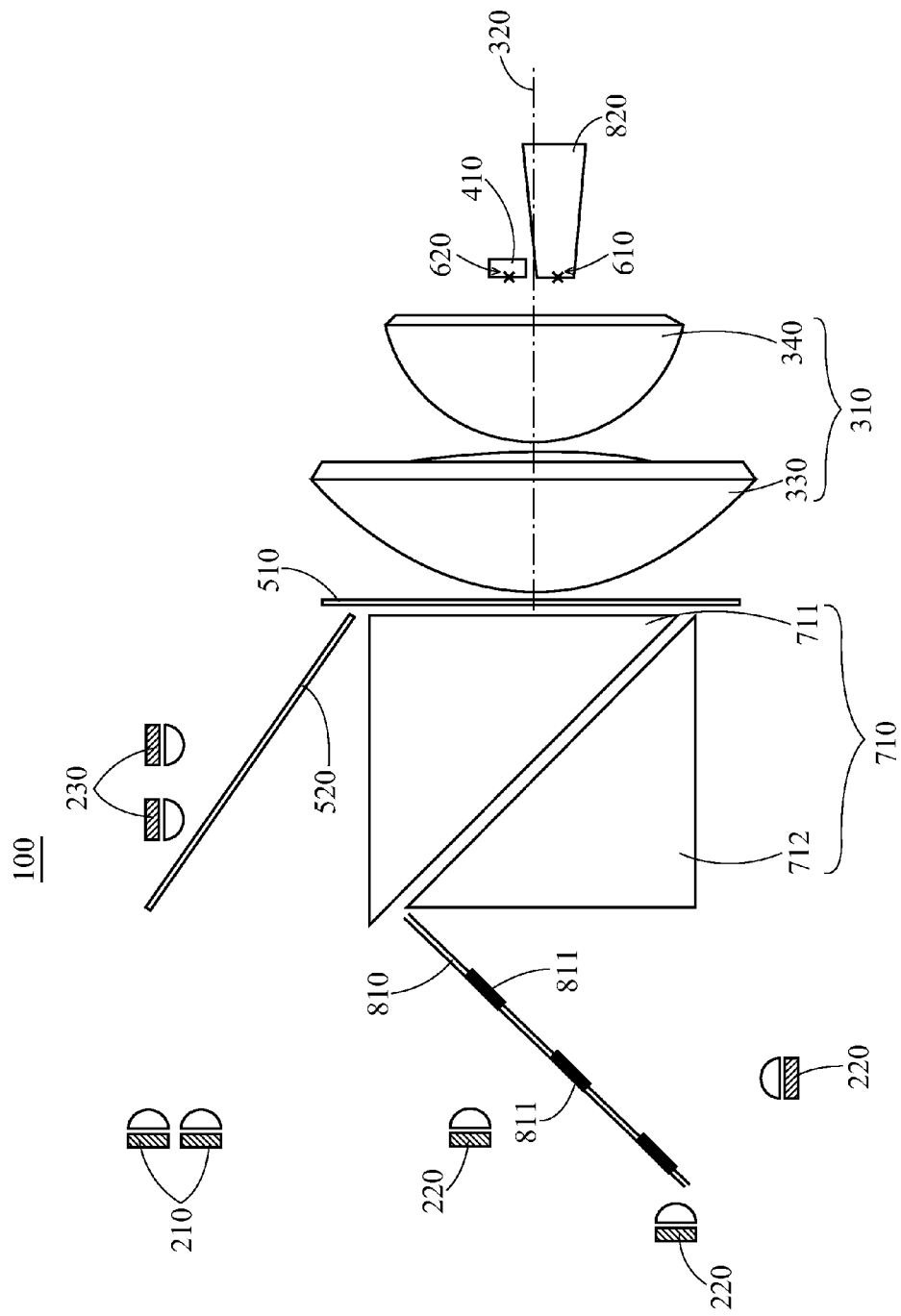
FIG. 2 is a schematic diagram illustrating an embodiment of an illumination system of the present invention.

As shown in FIG. 2, an illumination system 100 according to an embodiment of the present invention is disposed in a projection device (not shown), and comprises a first light source 210, a second light source 220, an optical device 310, a wavelength transformer 410 and a first dichroic mirror 510. In reference to both FIGS. 3A and 3B, the first light source 210 emits a first light beam 211, while the second light source 220 emits a second light beam 221. Furthermore, the optical device 310 can define a main optical axis 320, and focuses the first light beam 211 and the second light beam 221 on a first focal point 610 and a second focal point 620 respectively. As shown in FIG. 2, the first focal point 610 and the second focal point 620 are disposed at two opposite sides of the main optical axis 320 respectively. The first focal point 610 and the second focal point 620 are conjugate with each other, and an included angle defined by the first focal point 610 and the main optical axis 320 is equal to an included angle defined by the second focal point 620 and the main optical axis 320.

A light homogenizing device 820 has an inlet disposed at the first focal point 610 to receive the first light source 211, and has an outlet connected to the projection device (not shown) to actually project an image onto a micro-display (not shown) of the projection device.

The wavelength transformer 410 is disposed at the second focal point 620, and receives and transforms the second light beam 221 emitted by the second light source 220 into a third light beam 222. The first dichroic mirror 510, which is disposed between the first and the second light sources 210, 220 and the optical device 310, is adapted to allow the first light beam 211 and the second light beam 221 to travel therethrough and reflect the third light beam 222. In other words, as shown in FIG. 3B, when the second light beam 221, emitted by the second light source 220, is focused by the optical device 310 onto the wavelength transformer 410 that is disposed at the second focal point 620, the second light beam 221 is transformed into the third light beam 222. Then, the third light beam 222 is emitted from the second focal point 620 to pass through the optical device 310, and is then reflected by the first dichroic mirror 510 to the optical device 310 to be focused onto the first focal point 610.

Figure 3A:
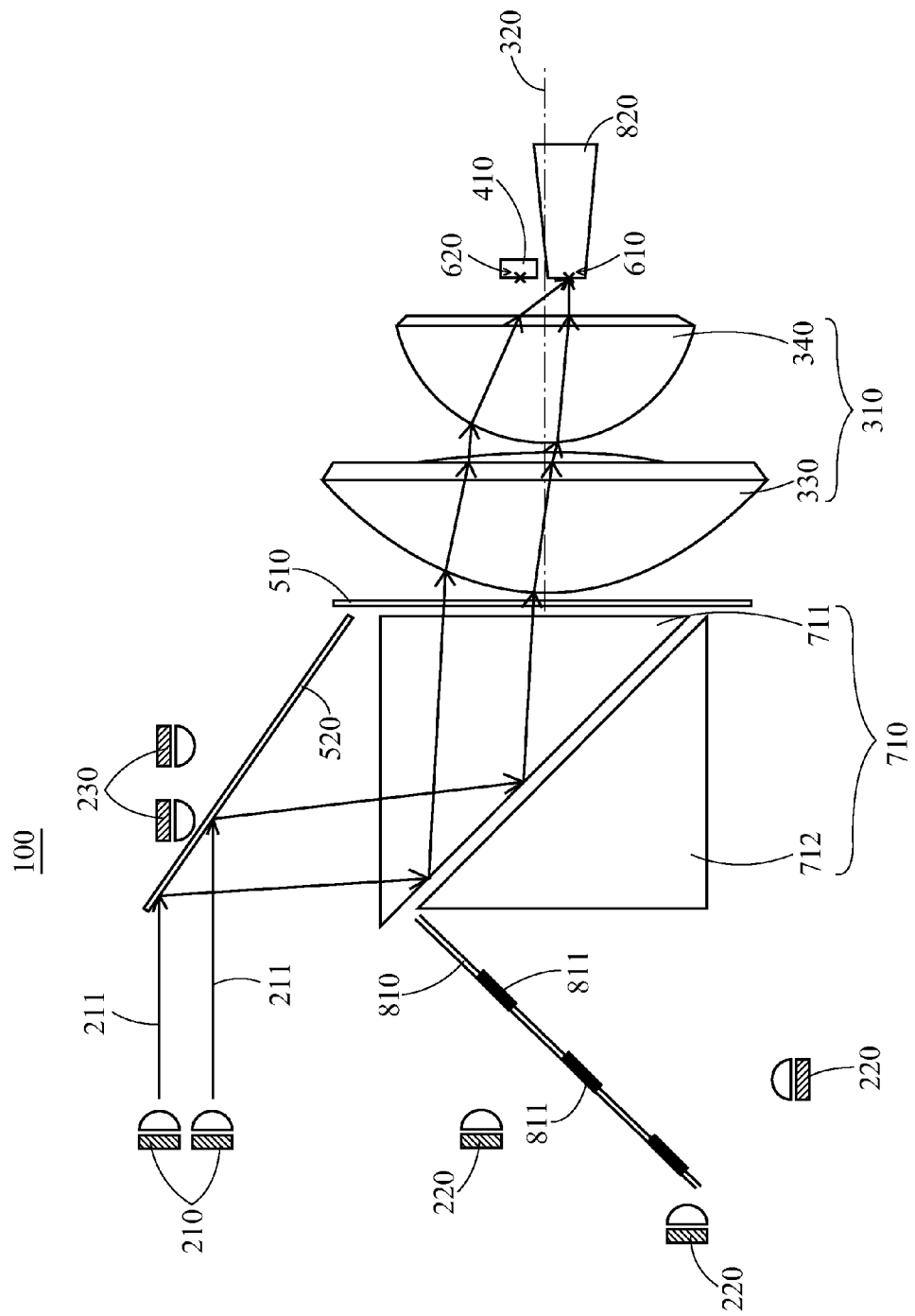
FIG. 3A is a schematic diagram illustrating an optical path of the first light beam in an embodiment.
Figure 3B:
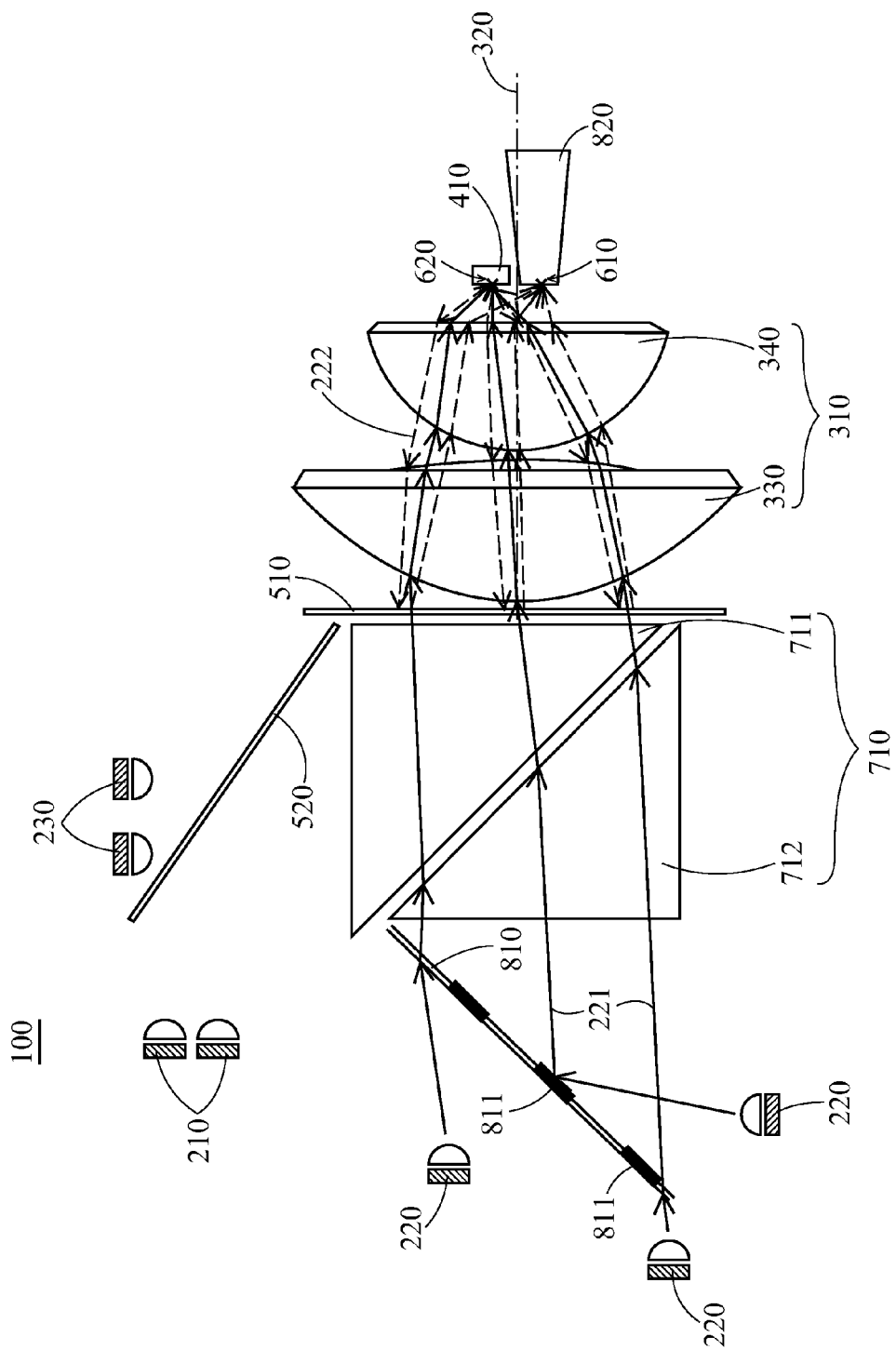
FIG. 3B is a schematic diagram illustrating an optical path of the second light beam and a third light beam in an embodiment.
Figure 3C:
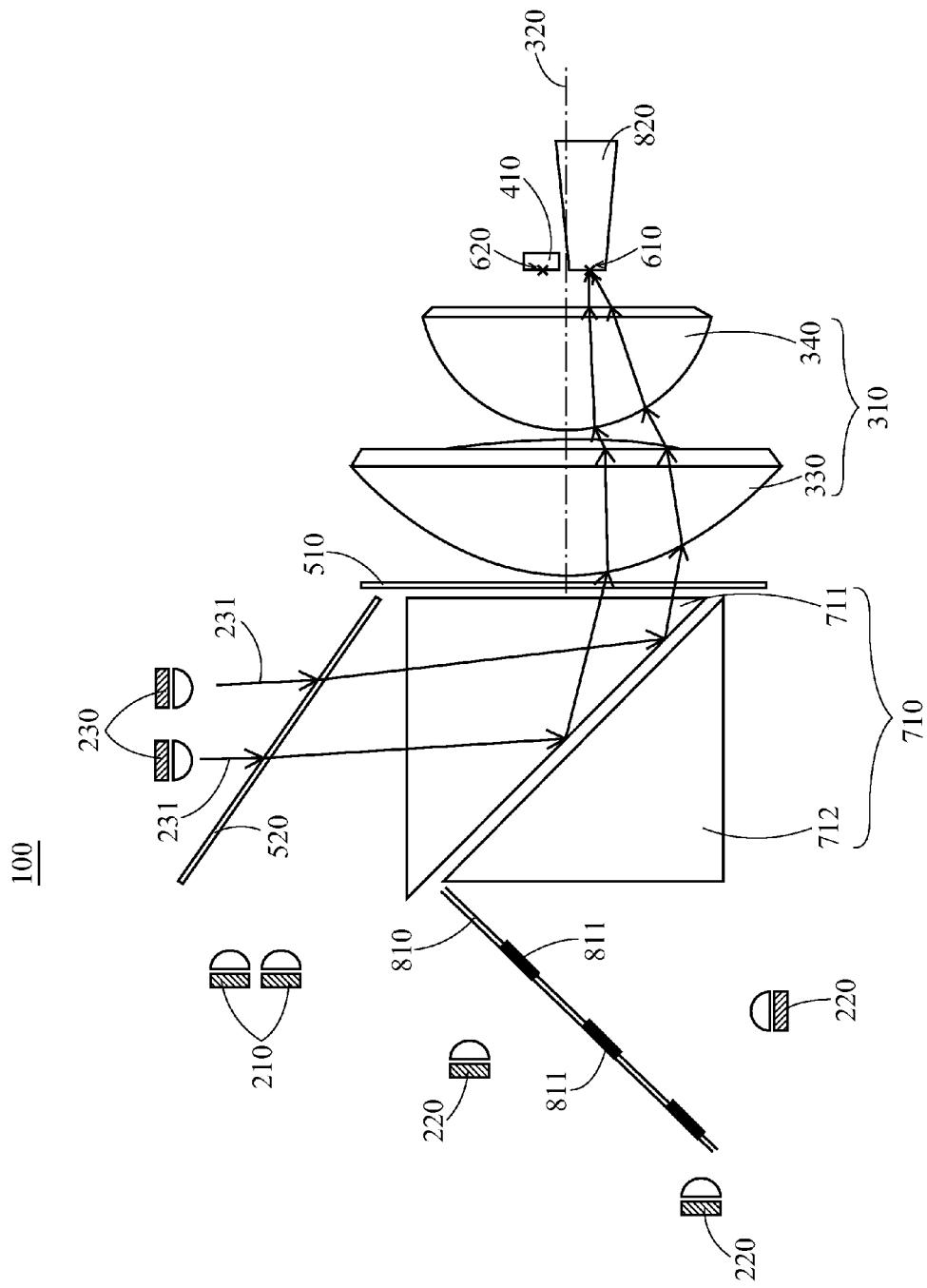
FIG. 3C is a schematic diagram illustrating an optical path of the fourth light beam in an embodiment.

In detail, in reference to both FIGS. 2 and 3C together, the illumination system 100 may further comprise a third light source 230 and a light coupling device 710. The third light source 230 is disposed adjacent to the first light source 210, and emits a fourth light beam 231 such that the fourth light beam 231 can travel through the first dichroic mirror 510 and be focused by the optical device 310 onto the first focal point 610. The light coupling device 710 is disposed between the first, the second and the third light sources 210, 220, 230 and the first dichroic mirror 510, and combines and guides the first light beam 211, the second light beam 221 and the fourth light beam 231 to the optical device 310.

Figure 4:
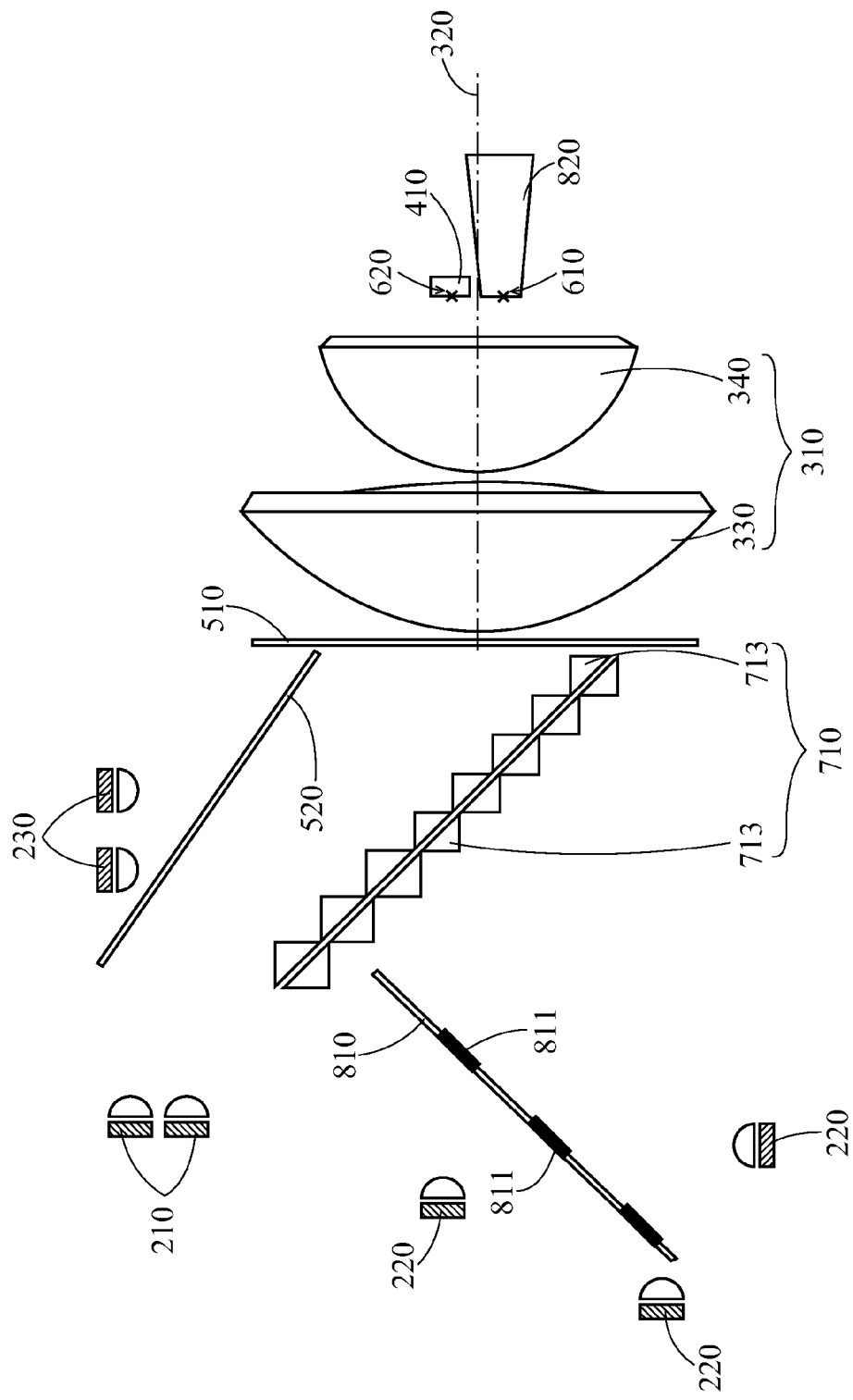
FIG. 4 is a schematic diagram illustrating another embodiment of the illumination system of the present invention.

In an embodiment of the present invention, the light coupling device 710 preferably comprises a first prism 711 and a second prism 712. It shall be appreciated that in the embodiment shown in FIG. 2, the first light source 210 and the third light source 230 are disposed on the upper side of the light coupling device 710, and the second light source 220 is disposed on the left side of the light coupling device. Therefore, as shown in both FIGS. 3A and 3C, when the first light source 210, the second light source 220 and the third light source 230 emit the first light beam 211, the second light beam 221 and the fourth light beam 231 to the light coupling device 710 respectively, the first light beam 211 and the fourth light beam 231 can be totally reflected by the first prism 711 to the optical device 310 to be focused onto the first focal point 610. Then, as shown in FIG. 3B, the second light beam 221 sequentially travels through the second prism 712, the first prism 711 and the optical device 310, and is then focused onto the wavelength transformer 410 disposed at the second focal point 620 to be transformed into the third light beam 222. Meanwhile, as shown in an embodiment in FIG. 4, the first prism 711 and the second prism 712 may also be formed as two prism arrays 713, which can also accomplish the propagation of the first light beam 211, the second light beam 221 and the fourth light beam 231 through the aforesaid optical paths.

Of course, depending on practical requirements, any modifications or adjustments may also be made to the aforesaid arrangement of the first light source 210, the second light source 220 and the third light source 230. For example, the positions of the first light source 210 and the third light source 230 are exchanged with the position of the second light source 220 such that the second light source 220 is disposed at the upper side of the light coupling device 710 and the first light source 210 and the third light source 230 are disposed at the left side of the light coupling device; in addition, the position of the light homogenizing device 820 is exchanged with the position of the wavelength transformer 410. Thus, when the first light source 210, the second light source 220 and the third light source 230 emit the first light beam 211, the second light beam 221 and the fourth light beam 231 to the light coupling device 710 respectively, the first light beam 211 and the fourth light beam 231 sequentially travel through the second prism 712, the first prism 711 and the optical device 310, and is then focused to the second focal point 620 to travel into the inlet of the light homogenizing device. The second light beam 221 can be totally reflected by the first prism 711 to the optical device 310 to be focused onto the wavelength transformer 410 disposed at the first focal point 610.

As shown in an embodiment of FIG. 3A, the illumination system 100 may further have a second dichroic mirror 520 and a mirror array 810. The second dichroic mirror 520 is disposed between the first light source 210, the third light source 230 and the light coupling device 710, and the first light beam 211 emitted by the first light source 210 is reflected by the second dichroic mirror 520 to the light coupling device 710. Meanwhile, as shown in an embodiment of FIG. 3C, the fourth light beam 231 can travel through the second dichroic mirror 520 to the light coupling device 710. Therefore, through the arrangement of the second dichroic mirror 520, the positional relationship between the first light source 210 and the third light source 230 will become more flexible. The mirror array 810 comprises a plurality of mirrors 811, and the second light source 220 comprises a plurality of secondary light sources for emitting a plurality of secondary light beams (not shown) respectively. One part of the secondary light beams travels through the gaps between the mirrors 811 to the light coupling device 710, and the other part of the secondary light beams is reflected by the mirrors 811 to the light coupling device 710. Therefore, through the arrangement of the mirror array 810, the second light beams 221 can be sufficiently provided to the wavelength transformer 410 to be transformed into sufficient third light beams 222 that travel into the light homogenizing device 820.

In the illumination system 100 according to an embodiment of the present invention, both the first light source 210 and the second light source 220 are comprised of a plurality of blue laser light sources, and both the first light beam 211 and the second light beam 221 are comprised of a plurality of blue light beams. The third light source 230 is a red laser light source, while the fourth light beam 231 is a red light beam. The wavelength transformer 410 may be a yellow or green phosphor, and correspondingly, the third light beam 222 is a yellow or green light beam. Meanwhile, the optical device 310 may comprise a first lens 330 and a second lens 340 disposed along the main optical axis 320. Opposite to the wavelength transformer 410 at the second focal point 620, a light homogenizing device 820 is disposed at the first focal point 610 to receive the first light beam 211, the third light beam 222 and the fourth light beam 231, which are projected outwards after being combined. The light homogenizing device 820 is preferably an integration rod or a light tunnel.

According to the above descriptions, the illumination system 100 according to an embodiment of the present invention utilizes solid light sources with both a high luminance and a long service life and operates in the following way:

(1) the first light beam 211 (a blue light beam) emitted by the first light source 210 (a plurality of blue laser light sources) sequentially travels through the second dichroic mirror 520, the light coupling device 710, the first dichroic mirror 510 and the optical device 310, and is finally focused onto the light homogenizing device 820 disposed at the first focal point 610;

(2) the second light beam 221 (a blue light beam) emitted by the second light source 220 (a plurality of blue laser light sources) sequentially travels through the mirror array 810, the combing device 710, the first dichroic mirror 510 and the optical device 310, and is then focused onto the wavelength transformer 410 (a yellow or green phosphor) disposed at the second focal point 620 to form the third light beam 222 (a yellow or green light beam); and then, the third light beam 222 is emitted from the wavelength transformer 410 to pass through the optical device 310, and is reflected by the first dichroic mirror 510 back to the optical device 310 to be focused onto the light homogenizing device 820 disposed at the first focal point 610; and (3) the fourth light beam 231 (a red light beam) emitted by the third light source 230 (a red laser light source) sequentially travels through the second dichroic mirror 520, the light coupling device 710, the first dichroic mirror 510 and the optical device 310, and is focused onto the light homogenizing device 820 disposed at the first focal point 610.

Therefore, by means of the optical components (e.g., the optical device 310, the light coupling device 710 and the like) disposed within the illumination system 100, the first light beam 211 (the blue light beam), the third light beam 222 (the yellow light beam or the green light beam) and the fourth light beam 231 (the red light beam) are all focused to the first focal point 610 and then combined into a homogenized white light beam by the uniform device 820 for projection outwards. This reduces the number of the optical components to be used and the volume of the illumination system and improves the light combining efficiency of the illumination system 100.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An illumination system for use in a projection device, comprising:
    a first light source for emitting a first light beam;
    a second light source for emitting a second light beam;
    an optical device defining a main optical axis and focusing the first light beam and the second light beam on a first focal point and a second focal point respectively, wherein the first focal point and the second focal point are disposed on two opposite sides of the main optical axis respectively;
    a wavelength transformer disposed at the second focal point and transforming the second light beam into a third light beam; and
    a first dichroic mirror disposed between the first light source, the second light source and the optical device, wherein the first light beam and the second light beam are allowed to travel through the first dichroic mirror, and the third light beam is reflected by the first dichroic mirror;
    wherein the third light beam is emitted from the second focal point, sequentially through the optical device, and is then reflected to the optical device by the first dichroic mirror to be focused on the first focal point.

2. The illumination system as claimed in claim 1, further comprising a light coupling device disposed between the first light source, the second light source and the first dichroic mirror and utilized for combining and guiding the first light beam and the second light beam to the optical device.

3. The illumination system as claimed in claim 2, further comprising a third light source for emitting a fourth light beam, wherein the fourth light beam is emitted to the light coupling device, passes through the first dichroic mirror, and is focused on the first focal point by the optical device; and
    a first dichroic mirror disposed between the light sources and the optical device, wherein the first light beam, the second light beam and the fourth light beam are allowed to travel through the first dichroic mirror, and the third light beam is reflected by the first dichroic mirror.

4. The illumination system as claimed in claim 3, wherein the light coupling device comprises a first prism and a second prism.

5. The illumination system as claimed in claim 4, wherein the first light beam and the fourth light beam are totally reflected to the optical device by the first prism and is focused on the first focal point, and the second light beam sequentially travels through the second prism, the first prism and the optical device, and is focused on the wavelength transformer disposed at the second focal point.

6. The illumination system as claimed in claim 4, wherein the first light beam and the fourth light beam sequentially travel through the second prism, the first prism and the optical device and is focused on the first focal point, and the second light beam is totally reflected to the optical device by the first prism and is focused on the wavelength transformer disposed at the second focal point.

7. The illumination system as claimed in claim 4, wherein the first prism and the second prism are two prism arrays.

8. The illumination system as claimed in claim 3, wherein the illumination system further comprises a second dichroic mirror, the first light beam is reflected to the light coupling device by the second dichroic mirror, and the fourth light beam travels through the second dichroic mirror to the light coupling device.

9. The illumination system as claimed in claim 3, wherein the illumination system further comprises a mirror array with a plurality of mirrors, the second light source comprises a plurality of secondary light sources for emitting a plurality of secondary light beams, one part of the secondary light beams travel through the mirrors to the light coupling device, and the other secondary light beams are reflected to the light coupling device by the mirrors.

10. The illumination system as claimed in claim 1, wherein the first light beam and the second light beam are a plurality of blue light beams.

11. The illumination system as claimed in claim 10, wherein the wavelength transformer is a yellow phosphor or a green phosphor, and correspondingly, the third light beam is a yellow light beam or a green light beam.

12. The illumination system as claimed in claim 11, wherein the first light source and the second light source are a plurality of blue laser light sources.

13. The illumination system as claimed in claim 3, wherein the fourth light beam is a red light beam.

14. The illumination system as claimed in claim 13, wherein the third light source is a red laser light source.

15. The illumination system as claimed in claim 1, wherein the optical device comprises a first lens and a second lens disposed along the main optical axis.

16. The illumination system as claimed in claim 1, wherein the illumination system further comprises a light homogenizing device disposed at the first focal point.

17. The illumination system as claimed in claim 16, wherein the light homogenizing device is an integration rod or a light tunnel.

18. The illumination system as claimed in claim 1, wherein the first focal point and the second focal point are conjugate with each other.

19. The illumination system as claimed in claim 18, wherein an included angle defined by the first focal point and the main optical axis is equal to an included angle defined by the second focal point and the main optical axis.

* * * * *